United States Patent
Sprigg et al.

(10) Patent No.: US 7,940,908 B2
(45) Date of Patent: May 10, 2011

(54) SHARING PROFILE DATA BETWEEN TELECOMMUNICATION DEVICES

(75) Inventors: Stephen A. Sprigg, Poway, CA (US); Paul E. Jacobs, La Jolla, CA (US); Nikhil Jain, San Diego, CA (US); Richard Wayne Gardner, III, Rancho Santa Fe, CA (US); Gina M. Lombardi, San Diego, CA (US); Jamie Y. Schipper, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 1361 days.

(21) Appl. No.: 11/361,406

(22) Filed: Feb. 23, 2006

(65) Prior Publication Data

US 2007/0206736 A1 Sep. 6, 2007

(51) Int. Cl.
*H04M 3/42* (2006.01)
*H04M 1/64* (2006.01)

(52) U.S. Cl. ........... 379/201.02; 379/88.19; 379/201.01; 379/201.07; 379/201.08; 455/415

(58) Field of Classification Search ............. 379/201.02, 379/88.19, 201.01, 201.07, 201.08; 455/415
See application file for complete search history.

(56) References Cited

U.S. PATENT DOCUMENTS

| 2002/0067816 A1* | 6/2002 | Bushnell ................. 379/201.02 |
| 2003/0063730 A1 | 4/2003 | Woodring |
| 2003/0139172 A1 | 7/2003 | Lampela et al. |
| 2004/0196966 A1* | 10/2004 | Bushnell ................... 379/88.19 |
| 2005/0100150 A1 | 5/2005 | Dhara et al. |
| 2009/0117886 A1* | 5/2009 | Urban et al. ................. 455/415 |

FOREIGN PATENT DOCUMENTS

| FI | EP0869688 | 10/1998 |
| WO | WO03056732 | 7/2003 |

* cited by examiner

*Primary Examiner* — Thjuan K Addy
(74) *Attorney, Agent, or Firm* — Fariba Yadegar-Bandari

(57) ABSTRACT

A telecommunications device and/or service enable a user to establish and maintain a profile which is then associated with the user or the user's telecommunication device (the "calling device"). The profile is stored on a profile server that is in communication with the telecommunications service provider. A receiving device receives a call from the calling device and is provided with the profile during call set-up. Some or all of the profile is used in connection with the incoming call on the receiving device.

44 Claims, 10 Drawing Sheets

SHARING PROFILE DATA BETWEEN TELECOMMUNICATION DEVICES

BACKGROUND OF THE INVENTION

1. Field of the Invention

The invention relates generally to the field of telecommunications, and more particularly to sharing profile data between users of telecommunications devices.

2. Description of Related Art

People today make widespread use of telecommunications equipment. Nearly every family in this country has at least conventional wired telephone service, and very many also have wireless telecommunications service. Telephone calls are made so frequently that it is a routine part of many people's day.

One feature, caller ID, has become so popular that many telecommunications customers insist on having it. The knowledge of who is calling before answering a phone call is all important to many people. When caller ID was originally created, only the caller's phone number was visible to the receiving party. Later, the calling party's name was added. However, until now, technological limitations and possibly a lack of imagination prevented further developments in communicating information about the calling party to the receiving party.

An alternative method and mechanism for communicating information about a calling party to a receiving party has eluded those skilled in the art, until now.

SUMMARY OF THE INVENTION

The invention is directed to telecommunications devices and services that enable a calling party (the "caller") to establish and maintain a profile that includes information that can be transmitted to a receiving party's (the "receiver") handset during call set-up to announce the incoming call from the caller. In one aspect, a method is provided for making profile data available to receiving devices. The method includes establishing a data connection with a profile server, the profile server being accessible by a remote device over a telecommunications network. The method further includes creating a profile at the profile server, the profile including profile data, the profile being associated with a calling device. The method still further includes instructing the telecommunications network to make the profile data available to the remote device in response to a call to the remote device over the telecommunications network from the calling device.

In another aspect, a method is provided for receiving profile data about a calling device at a receiving device. The method includes receiving call data associated with an incoming call, the call data including an identifier for the calling device. The method further includes initiating a data session with a profile server, and querying the profile server for a profile associated with the calling device using the identifier, the profile containing the profile data. The method still further includes retrieving the profile data from the profile server, and using the profile data in connection with the incoming call. An apparatus is also envisioned that is configured to implement this method.

In yet another aspect, a method is provided for facilitating the delivery of profile data about a calling device to a receiving device. The method includes receiving a request to establish a call from the calling device to the receiving device, and notifying the receiving device about the call, the notification including an identifier for the calling device. The method further includes receiving a request from the receiving device for profile data associated with the calling device based on the identifier. The method still further includes accessing a profile corresponding to the identifier to retrieve the profile data, and returning the profile data to the receiving device. An apparatus is also envisioned that is configured to implement this method.

DETAILED DESCRIPTION

What follows is a detailed description of various techniques and mechanisms for profile sharing. Very generally stated, a telecommunications device and/or service are provided that enable a user to establish and maintain a profile which is then associated with the user or the user's telecommunication device (the "calling device"). The profile is stored, for example, on a profile server that is in communication with the telecommunications service provider. A receiving device receives a call from the calling device and is provided with the profile during call set-up. Some or all of the profile is used in connection with the incoming call on the receiving device. This general concept will now be described in greater detail in connection with certain specific non-limiting embodiments.

Before proceeding, it will be helpful to define some terms that will be used while describing embodiments of the invention. Accordingly, throughout this patent document, the following terms shall have the meanings ascribed to them here:

The term "call" means any communication between two telecommunication devices, and is not limited to telephone calls. Rather, the term "call" will be used in the broadest sense and includes conventional telephone calls, Voice Over IP (VOIP) calls, and may include any other message or communication between two devices, such as SMS messages, instant messages, e-mail, and the like.

The term "announcement" or "call announcement" means a sensory perceptible occurrence that is performed by a telecommunication device to indicate an incoming call. An announcement could be a media file (e.g., a sound or image file), a particular sequence of flashing or steady lights, a vibration, textual or alphanumeric information or any other sensory perceptible mechanism.

The term "calling device" means a telecommunications device that originates an outbound call. The term calling device may be used interchangeably throughout this document with the terms "calling party," "caller," or "originating device."

The term "receiving device" means a telecommunications device that receives an inbound call. The term receiving device may be used interchangeably throughout this document with the terms "called party," "recipient," or "receiving party."

Figure 1:
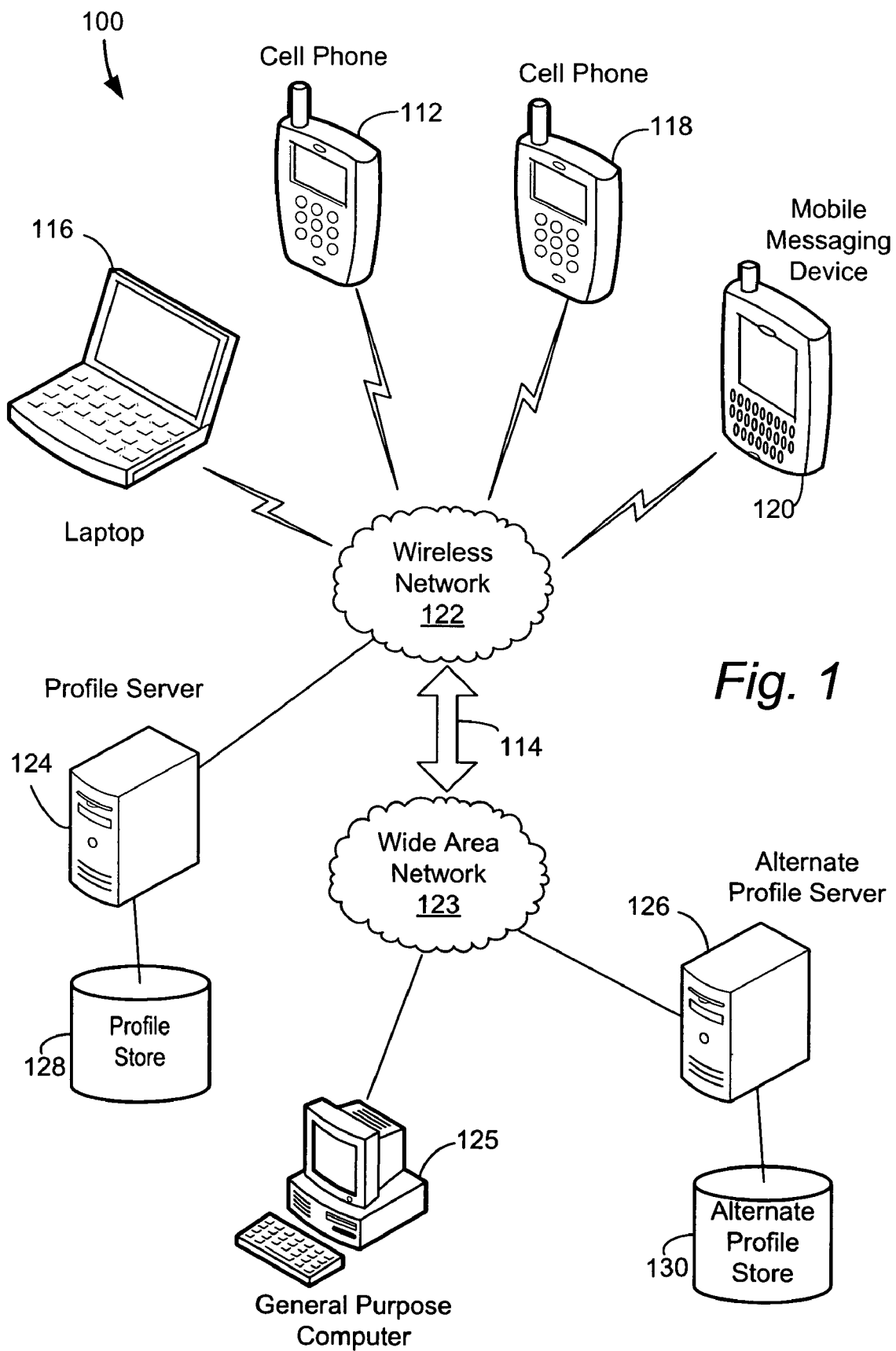
FIG. 1 is a functional block diagram generally illustrating a sample mobile device in which implementations of the invention are particularly applicable.

FIG. 1 is a functional block diagram of a system 100 implementing one embodiment of the present invention. Shown in FIG. 1 are several mobile devices that communicate with each other over a wireless communication network 122 that is administered by a service provider. Several different types of mobile devices may be connected to the wireless network, such as cellular phones (112, 118) or other mobile messaging devices 120. Computing systems may also be connected to the wireless network, such as a laptop computer 116. A profile server 124 is also connected to the wireless network and is accessible to devices coupled to the wireless network.

The wireless network 122 is coupled to a public wide area network 123, such as the Internet. Computing devices, such as a general purpose computer 125, connected to the public wide area network 123 may have access to other computing devices on both the public network 123 and possibly the wireless network 122, such as the profile server 124, over a network bridging link 114. An alternate profile server 126 could be connected to the public network 123 in addition to or in lieu of the first profile server 124.

In this particular implementation, one (or both) of the profile servers (124, 126) includes a profile store (128, 130) on which is stored a plurality of profiles. Each profile is maintained in correspondence with one or more of the mobile devices. The profile store 128 is described in greater detail in conjunction with FIG. 4 below. Briefly stated, a profile includes information about a calling party or device, such as contact information, call announcement information and/or content, images, or the like. The profile is associated with the calling device, perhaps using the phone number or other identifier of the calling device. The information stored at the profile server 124 may or may not be accessible by other users of the wireless network 122.

Generally stated, when a user makes a call from the calling device (e.g., cell phone 118) to a receiving device (e.g., mobile messaging device 120), the wireless network 122 retrieves the corresponding profile from the profile server 124 and presents it to the receiving device during call setup. In this way, more information may be presented to the receiving party to announce the incoming call. For example, if the originating party included an image in the profile, the image may be displayed on the receiving device in combination with the call announcement, which enables the receiving device to identify the caller by picture even though the picture was not pre-installed on the receiving device. In addition, contact information for the calling device may be easily communicated to the receiving device with little or no effort on the part of the receiving party.

Figure 2:
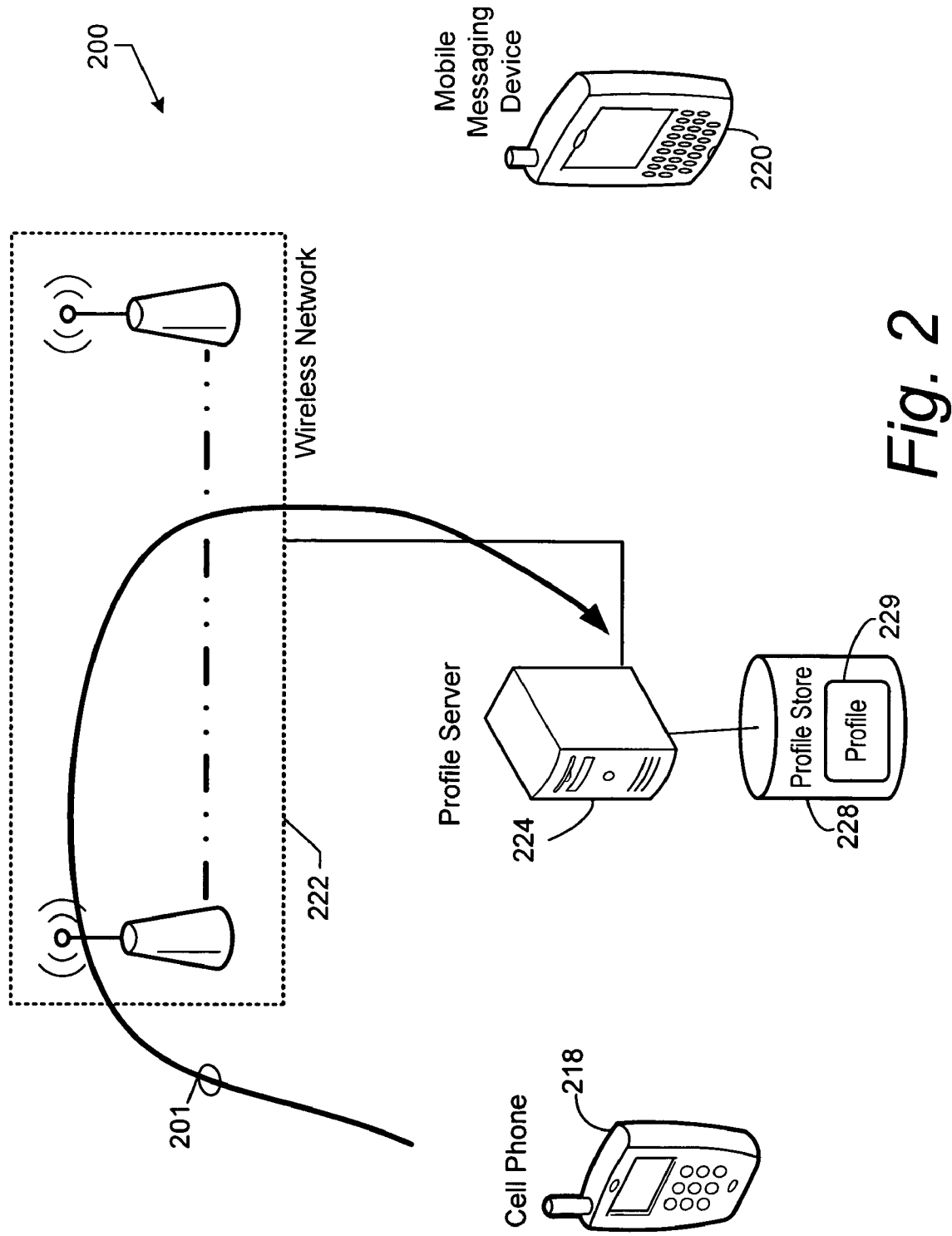
FIG. 2 is a functional block diagram illustrating in slightly greater detail the storage medium loaded with data that is employed by certain implementations of the invention.

FIG. 2 is a functional block diagram more specifically illustrating components of a system 200 for sharing profile data between users of mobile devices in a communications network. The components include a calling device 218 and a receiving device 220. The calling device 218 and the receiving device 220 may be any telecommunications devices with at least rudimentary computing capability, such as cellular telephones or mobile messaging devices. The two devices communicate over a telecommunications network, which in this particular example happens to be a wireless network 222. It will be appreciated that many other components and even other intervening communications networks may be incorporated within the wireless network 222, such as wired networks like the Public Switched Telephone Network (PSTN). The wireless network 222 is used in this description to generally indicate any telecommunications infrastructure that can be used to enable telecommunications devices to communicate.

A profile server 224 is connected to the wireless network 222 in some manner. For example, the profile server 224 may be collocated with and coupled to a component of the wireless network 222 such as a mobile telephone switching office or the like. Alternatively, the profile server 224 may be indirectly coupled to the wireless network 222 over a wide area network or the like.

As mentioned above, the profile server 224 includes a profile store 228 on which reside profiles for certain subscribers or users of the wireless network 222. In this particular implementation, the user of the calling device 218 accesses the profile server 224 and creates a profile 229 associated with that calling device 218. The calling device 218 may access the profile server 224 by establishing a data call 201 over the wireless network 222 to support data communications between the calling device 218 and the profile server 224. Alternatively, the user may access the profile server 224 using some other mechanism, such as another computing device (not shown) coupled to the wireless network 222 through a wide area network, like the Internet. In any event, the user accesses the profile server 224 to create and maintain the profile 229 in the profile store 228, and to associate that profile 229 with the calling device 218.

Figure 4:
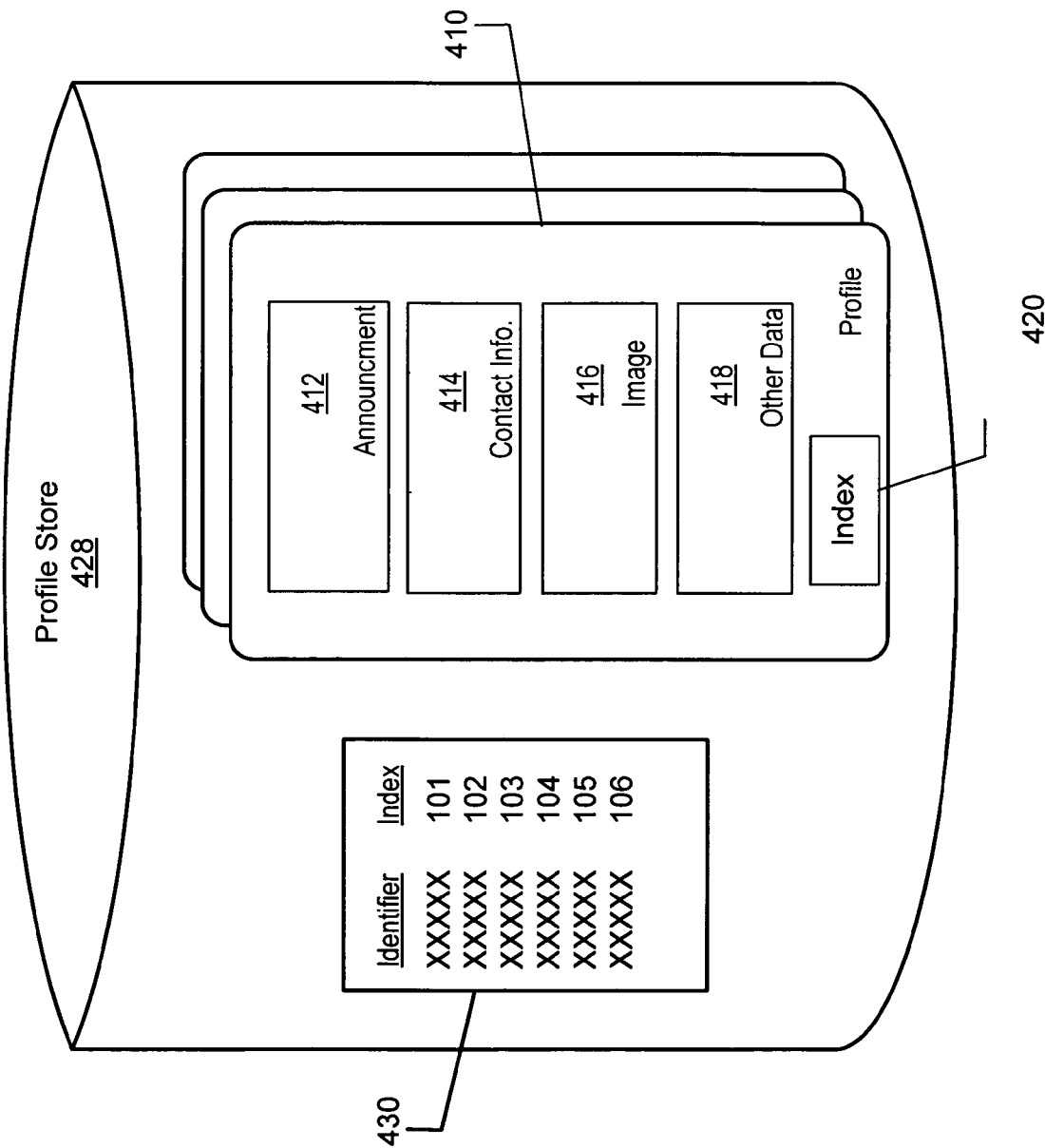
FIG. 4 is a functional block diagram generally illustrating a sample message format that may be used in implementations of the invention.

Briefly stated, the profile 229 may include almost any information the user desires to make available, such as contact information, a desired ringtone, an image, a brief message, or the like. Although any arbitrary information may be included, size limitations may be imposed to ensure that the information can be delivered during call set-up. The size limitations may be based on the available bandwidth and latency of the network over which the profile information will be retrieved (e.g., wireless network 222). These size limitations may be eliminated in implementations where the profile information is delivered outside of call set-up. One sample profile is illustrated in FIG. 4 and described below.

The profile 229 may be associated with the calling device 218 using any one or more of various mechanisms. For example, the profile 229 may be associated with various identifiers of the calling device 218, such as the phone number or mobile identification number (MIN), an electronic serial number (ESN), a mobile equipment identification number (MEID), or the like. The association may be stored on the profile server 224 in a database, or perhaps in a subscriber database maintained by one or more components of the wireless network 222.

In summary, the system 200 enables the user of the calling device 218 to create or modify a profile 229 on the profile store 228. The profile 229 may then be made accessible by other devices, such as the receiving device 220, over the wireless network 222.

Figure 3:
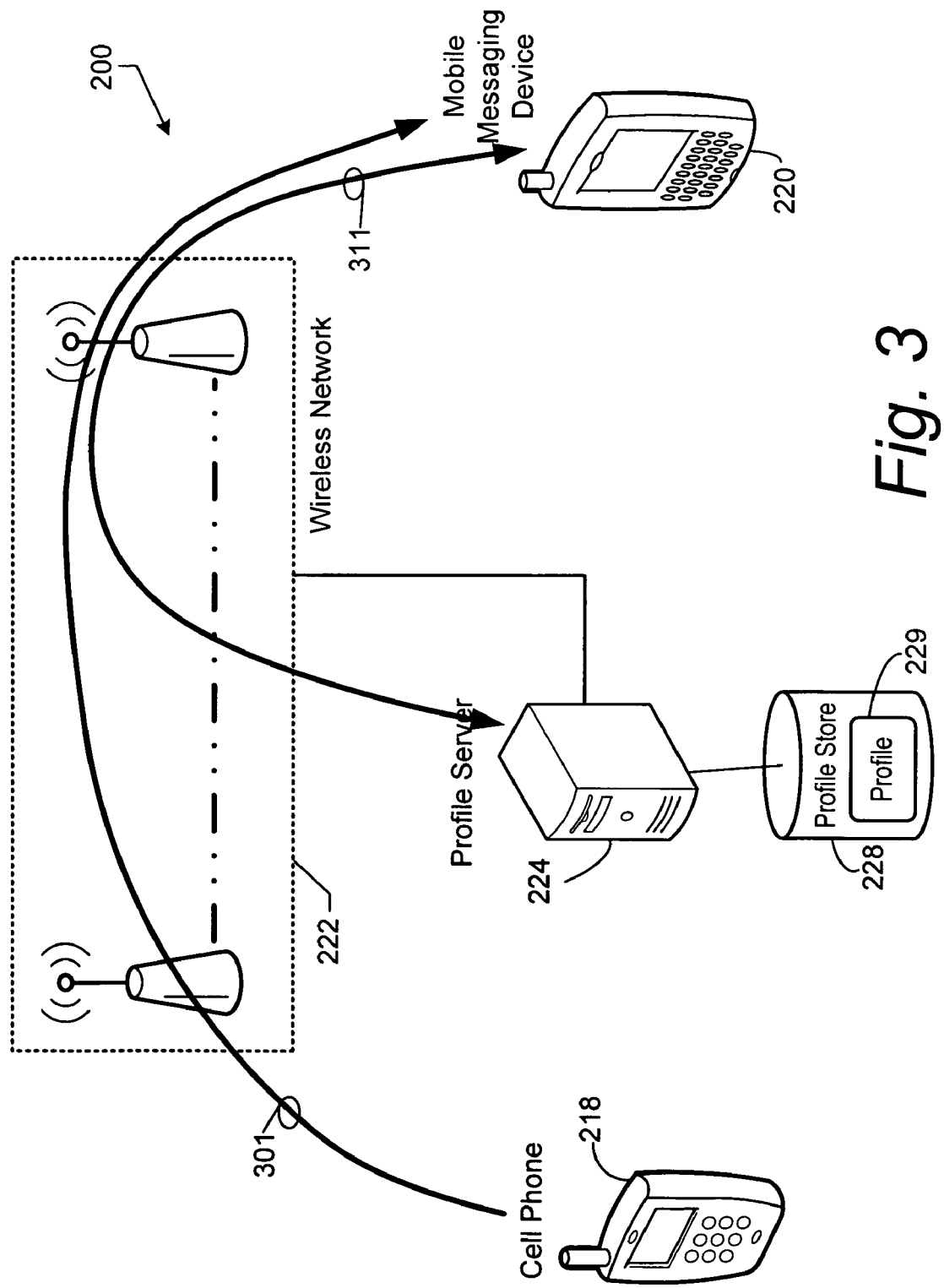
FIG. 3 is a conceptual illustration of a system that implements the invention to enable a call originating device to direct the announcement that is made on a call receiving device when a call is received from the originating device.

FIG. 3 is a functional block diagram illustrating the use of the system 200 shown in FIG. 2 to provide profile data to the receiving device 220 in conjunction with a call from the calling device 218. As above, the profile server 224 includes the profile store 228 on which the user has created the profile 229. The profile 229 has also been associated with the calling device 218, as described above. The profile server 224, and hence the profile store 228, is operatively coupled to the wireless network 222.

When a call 301 is made from the calling device 218 to the receiving device 220, components of the wireless network 222, such as one or more switching offices (not shown), receive and route the call 301 through the wireless network 222, including any intervening communications networks, to the receiving device 220.

In a network-based implementation, during call set-up, the wireless network 222 analyzes the call 301 to determine who the originating party is (i.e., the calling device 218). This determination may be made using call data embedded in the call 301, such as the phone number, the ESN, or perhaps the MIN of the calling device 218. The wireless network 222 may then retrieve the calling device's profile 229 from the profile store 228 and pass at least a portion of the profile 229 to the receiving device 220. The term "profile data" refers to any portion of the data stored in the profile 229 and retrieved for the purposes discussed in this document. "Profile data" may be all of the profile 229, or any portion or portions of the profile 229 in any combination.

In this implementation, the profile data may be included in caller ID information transmitted in conjunction with the call 301, perhaps as an extension to the Multiple Data Message Format (MDMF) protocol, and transmitted from the wireless network 222 to the receiving device 220. If an alternative protocol is used to set-up the call, the profile information could be included in whatever data package or packages are initially transmitted to the receiving device 220 by the wireless network 222. When received, the receiving device 220 uses the profile data in any appropriate manner, such as to announce the incoming call 301 or to update the calling party's contact information stored on the receiving device 220.

It should be appreciated that the wireless network 222 may first determine if the receiving device 220 is subscribed to a service that authorizes remote profile announcements. For example, the service provider responsible for the wireless network 222 may only provide profile data to receiving devices 220 that are subscribed to an optional service or feature. This determination may be performed by a switching office or the like (not shown).

In a device-based implementation, the wireless network 222 notifies the receiving device 220 of the incoming call 301 in a substantially conventional manner. However, during call set-up the receiving device 220 immediately initiates a data call 311, perhaps using an EVolution Data Optimized (EV-DO) wireless data network, to the profile server 224. This simultaneous data call 311 enables the receiving device 220 to connect to the profile server 224 and retrieve profile data from the profile 229 on the profile store 228.

With either of these implementations, the calling device 218 can determine or influence how the incoming call 301 is announced on the receiving device 220. For example, if a personal ringtone is stored in the profile 229, that ringtone can be used to announce the incoming call on the receiving device 220. More specifically, using the data call 311, the wireless network 222 could "stream" the ringtone to the receiving device 220 to enable it to begin playing the ringtone immediately. The service could be configured such that the ringtone can be saved on the receiving device 220, perhaps for a fee. In another example, an image, such as a picture of the calling party or an avatar of the calling party's choosing, may be delivered to the receiving device 220 and displayed. In still another example, the user of the calling device 218 could include contact information in the profile 229. Using this, the receiving device 220 could be updated with current contact information for the calling party without any additional effort by the user of the receiving device 220.

It should be noted that the profile data need not necessarily be delivered during call set up. In some circumstances, such as the contact information example, the profile data could be delivered using the data call 311 in the background while the original incoming call 301 is being conducted. This may be useful if the profile data is not needed or used to announce the incoming call 301, or if the profile data is just too large to be delivered during call set up. In the former case, the profile data could be downloaded by the receiving device 220 and stored in an appropriate location while the voice call 301 is occurring. In the latter case, the profile data could be downloaded by the receiving device 220 and, if related to call announcements, used to announce subsequent calls from the calling device 218. In another alternative, the profile data could be downloaded to the receiving device 220 after the voice call has terminated, such as when the receiving device 220 is normally idle.

FIG. 4 is a functional block diagram illustrating a profile store 428 on which resides one or more profiles 410, as envisioned by certain implementations of the invention. As mentioned above, the profile store 428 is maintained by a profile server (not shown) which is in operative communication with a telecommunications network.

Each profile, includes "profile data," which may include any arbitrary data that the user desires to make available to others. The profile 410 may additionally include other information that the user does not wish to be made available to others. The profile data is envisioned to likely include call announcements 412 and/or contact information 414. The call announcements 412 may be media files, such as music or distinctive audio tones (commonly referred to as "ringtones"), that are rendered to announce an incoming call. There are several different types of media files in many different formats that could be used to identify incoming calls. For instance, monophonic or polyphonic audio files could be used in different formats, such as MIDI, CMX, RTTTL, AIFF, SMAF, PCM, MP3, WAV, and the like.

Although the call announcements 412 are described here as audio files, it will be appreciated that the call announcements 412 could be any type of resource that includes description information for any perceptible type of announcement. For instance, if the mobile device announced incoming calls with distinctive vibratory announcements, each call announcement 412 could include a different description of a vibration. Similarly, if the mobile device announced incoming calls with distinctive flashing lights, the call announcements 412 could each describe a distinct pattern of flashing or colored lights, or some combination of the two. These are but examples and others will become apparent with routine experimentation.

The contact information 414 includes data that describes individuals or entities. Examples of the contact information 414 that may be stored in the profile 410 include the name of the person with whom the profile 410 is associated, the company that employs the person, the person's telephone number and address, the person's e-mail address, and other information.

The profile 410 may also include an image 416, which may be a picture of the person with whom the profile 410 is associated. The image 416 could also be a picture of any other person or thing that the person desires. The image 416 could also be a clipart image, such as an avatar or other icon that the person desires. Such clipart images are in common usage in connection with electronic forums, bulletin boards, and instant messaging services.

The profile 410 could also include any other data 418 that the user desires to make available to others. For example, a brief textual message (or the like) could be included in the profile 410. An index 420 is included with the profile 410 to uniquely distinguish the profile 410 from other profiles on the profile store 428. The index 420 could be any form of identifier.

The profile store 428 also includes, in this implementation, a profile table 430 that maps calling party identifiers to indexes for the profiles. The calling party identifiers may be any form of information used to uniquely distinguish one calling device from another calling device, such as a phone number, MIN, ESN, MEID, or the like. The indexes are the particular indexes associated with each profile, such as index 420. The profile table 430 associates the profiles with the particular telecommunications devices that will be used to make calls.

Figure 5:
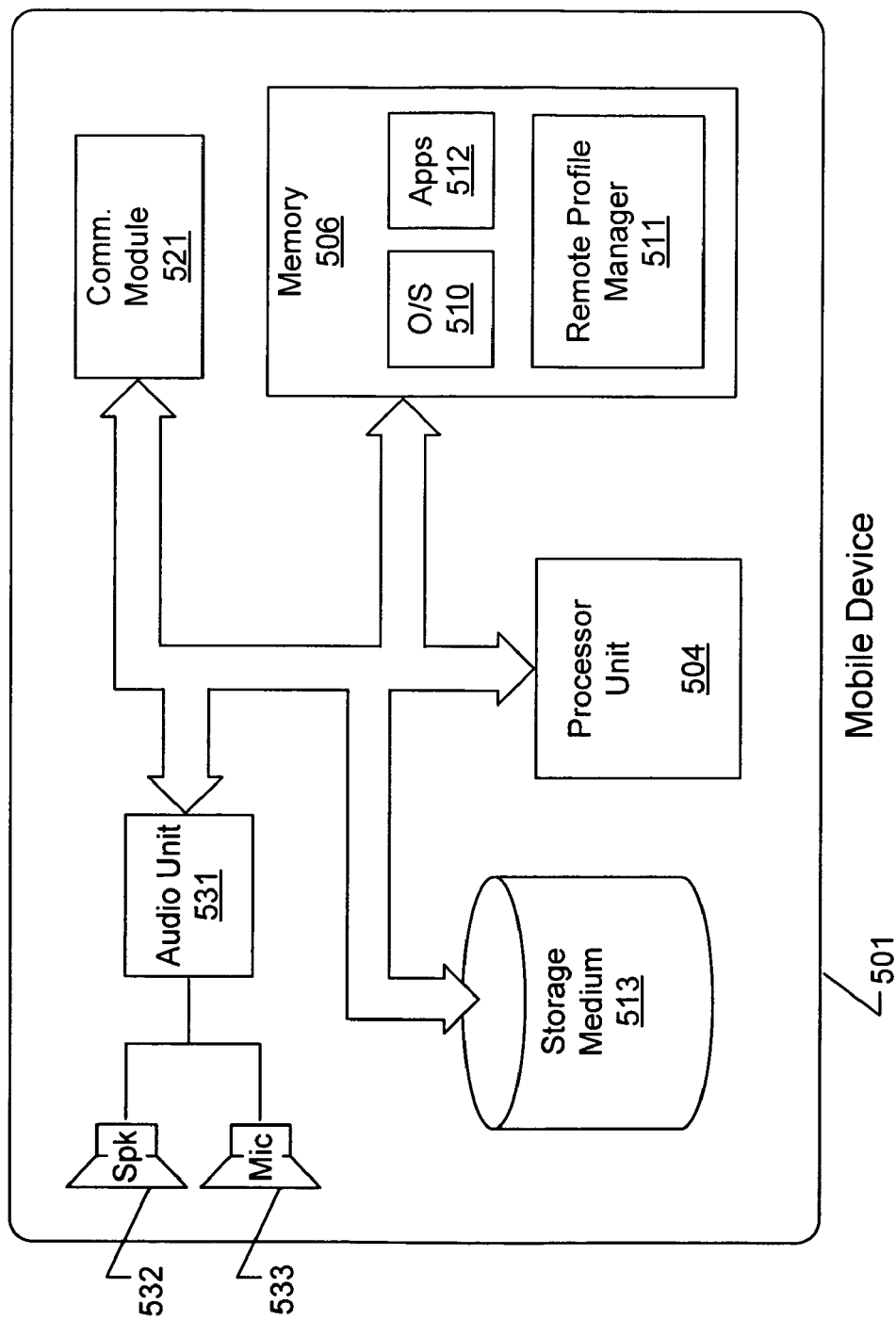
FIG. 5 in an operational flow diagram generally illustrating one implementation of a process performed on a call originating device for associating particular call announcements to be played on a receiving device when receiving calls from the originating device.

FIG. 5 is a functional block diagram generally illustrating a sample mobile device 501, such as a cellular telephone, in which implementations of the invention are particularly applicable. The mobile device 501 may be any handheld computing device, such as a cellular telephone, mobile messaging device, a personal digital assistant, a portable music player, a global positioning satellite (GPS) device, or the like. Although described here in the context of a handheld computing device, it should be appreciated that implementations of the invention may have equal applicability in other areas, such as conventional wired telephone systems and the like.

In this example, the mobile device 501 includes a processor unit 504, a memory 506, a storage medium 513, and an audio unit 531. The processor unit 504 advantageously includes a microprocessor or a special-purpose processor such as a digital signal processor (DSP), but may in the alternative be any conventional form of processor, controller, microcontroller, or state machine.

The processor unit 504 is coupled to the memory 506, which is advantageously implemented as RAM memory holding software instructions that are executed by the processor unit 504. In this embodiment, the software instructions stored in the memory 506 include a remote profile manager 511, a runtime environment or operating system 510, and one or more other applications 512. The memory 506 may be on-board RAM, or the processor unit 504 and the memory 506 could collectively reside in an ASIC. In an alternate embodiment, the memory 506 could be composed of firmware or flash memory.

The processor unit 504 is coupled to the storage medium 513, which may be implemented as any nonvolatile memory, such as ROM memory, flash memory, or a magnetic disk drive, just to name a few. The storage medium 513 could also be implemented as any combination of those or other technologies, such as a magnetic disk drive with cache (RAM) memory, or the like. In this particular embodiment, the storage medium 513 is used to store data during periods when the mobile device 501 is powered off or without power. The storage medium 513 could be used to store contact information or call announcements, such as ringtones.

The mobile device 501 also includes a communications module 521 that enables bidirectional communication between the mobile device 501 and one or more other computing devices. The communications module 521 may include components to enable RF or other wireless communications, such as a cellular telephone network, Bluetooth connection, wireless local area network, or perhaps a wireless wide area network. Alternatively, the communications module 521 may include components to enable land line or hard wired network communications, such as an Ethernet connection, RJ-11 connection, universal serial bus connection, IEEE 1394 (Firewire) connection, or the like. These are intended as non-exhaustive lists and many other alternatives are possible.

The audio unit 531 is a component of the mobile device 501 that is configured to convert signals between analog and digital format. The audio unit 531 is used by the mobile device 501 to output sound using a speaker 532 and to receive input signals from a microphone 533. Audible announcements of an incoming call can be created using the audio unit 531 and the speaker 532. For instance, distinctive ringing noises can be played to announce an incoming call. Various musical notes or tunes could also be used.

Although incoming calls are announced audibly in this implementation, other mechanisms could also be employed. For example, a vibratory mechanism (not shown) could be used to announce calls by vibrating the mobile device 501 in a unique manner for different callers. Or a system of lights could be used that flash in a unique sequence or with different colors. The breadth of the invention is envisioned to encompass announcements delivered using any sensory perceptible mechanism or technique.

The remote profile manager 511 is a utility or service that is configured to evaluate an incoming call to identify identifying information about the calling party. The remote profile manager 511 is further configured to initiate or accept a data call to or from a remote profile server using the communications module 521. Using the call identifying information, the remote profile manager 511 is configured to retrieve profile data about the calling party from the remote profile server.

The remote profile manager 511 may also cooperate with other applications 512 to handle or consume the profile data. For example, if the profile data includes a ringtone, the remote profile manager 511 may hand that ringtone off to a component of the OS 510 that is responsible for announcing incoming calls. If the profile data includes contact information, the remote profile manager 511 may hand the profile data off to a contact manager (within the other applications 512) for inclusion in a local contact data store (on the storage medium 513).

Figure 6:
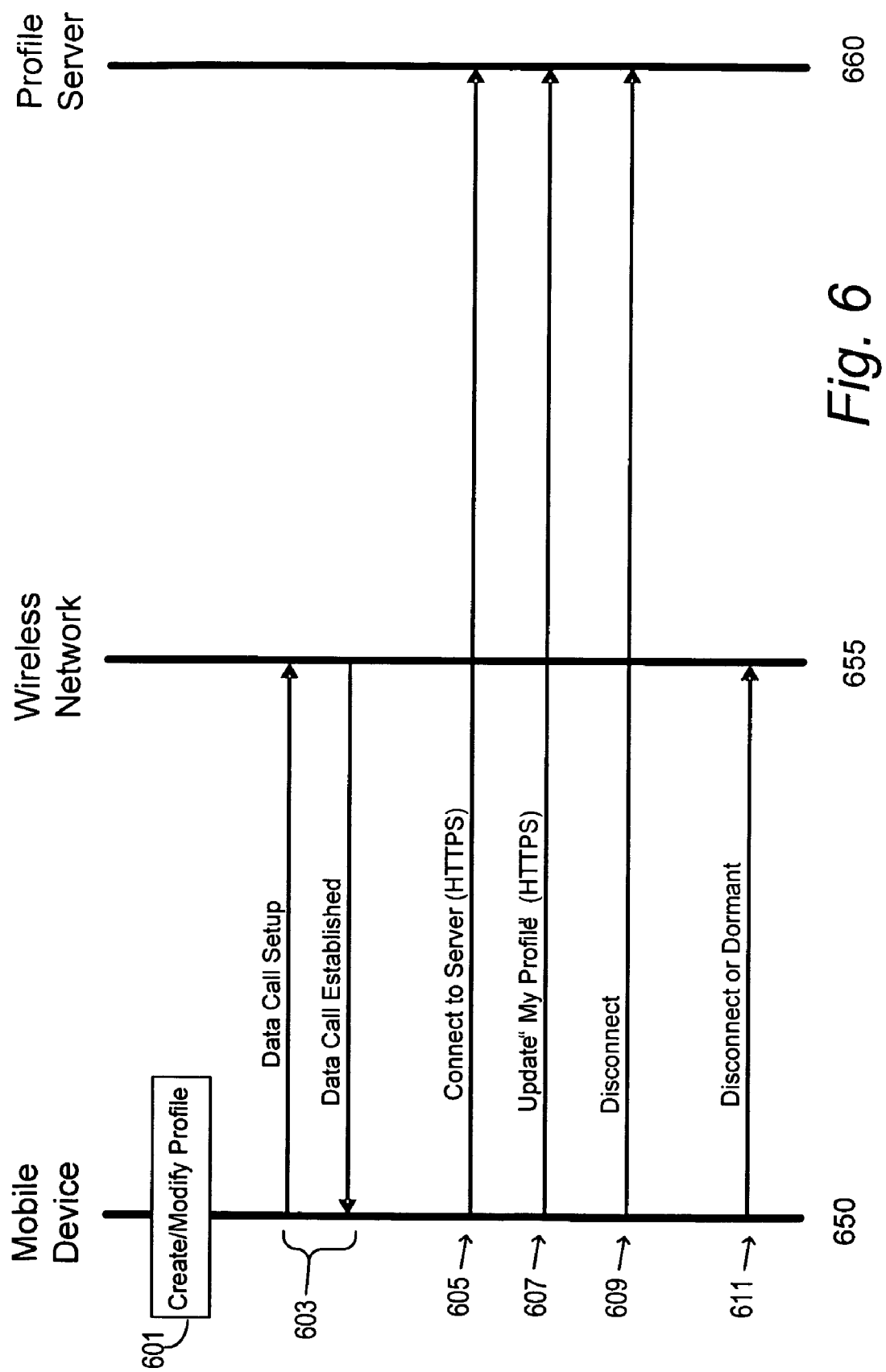
FIG. 6 is an operational flow diagram generally illustrating a process for announcing an incoming call using a call announcement identified by the device originating the call.

FIG. 6 is a process diagram generally illustrating a sequence of operations performed by certain elements of a system to create and maintain a remote profile. The particular elements involved in the process include a mobile device 650, a wireless network 655, and a profile server 660. Each of these three elements may be similar in configuration and functionality to their counterparts described at length above. The process begins at step 601.

At step 601, the mobile device 650 is used to create or modify a locally-stored profile. In this particular implementation, the mobile device 650 includes a data store or template that is used to build a profile, allowing a user of the mobile device 650 to input arbitrary data. For example, a default ringtone that should be used to announce calls from the mobile device 650 may be stored in the profile. Certain additional ringtones that should be used by particular other individuals to announce calls from the mobile device 650 may also be included. Contact information that describes the user of the mobile device 650 may also be included. A 'signature' of the profile could be stored in conjunction with the profile to aid in determining whether the profile has changed. The 'signature' could be any information used to uniquely identify a particular state of the profile, such as a hash, a digest, a time stamp, or the like. This information can be used by a receiving device, as described below in conjunction with FIG. 7, to determine whether to retrieve the profile in conjunction with a subsequent call.

At step 603, a data call is initiated and established between the mobile device 650 and the wireless network 655. In one particular embodiment, the data call may be established using an EV-DO technology that supports simultaneous voice calls and data calls. Alternatively, an ordinary data connection between the mobile device 650 and the wireless network 655 may be established.

At step 605, the mobile device 650 connects to the profile server 660 over the data call just established. The connection could be made using browser-based software or some other special purpose software resident on the mobile device. The connection may use a hypertext transfer mechanism in combination with a packet-based protocol, such as HTTP over a TCP/IP connection, or any other transport protocol. In one example, the profile server 660 is identified by a Universal Resource Locator (URL) or Universal Resource Identifier (URI), and a user inputs the URL or URI to browser software which navigates to the profile server 660. The connection may additionally use an encrypted and secure version of the transport protocol to enhance security and data integrity.

At step 607, the mobile device 650 transmits the profile created at step 601 to the profile server 660. In one example, the mobile device 650 may transmit the profile by uploading it to the profile server 660 and either creating a new profile or modifying an existing profile. Alternatively, the profile could be created or modified directly at the profile server 660 without resort to first creating the profile at the mobile device 650 locally. While connected to the profile server 660, the mobile device 650 may also alter other settings associated with the profile. For example, the user may desire to attach certain privileges or other authorizations to limit access to the profile.

At step 609, the data session between the mobile device 650 and the profile server 660 is terminated. At step 611, the data call between the mobile device 650 and the wireless network 655 is either disconnected or goes dormant. The data call could either be disconnected manually, or perhaps as the result of a timeout event.

It should be appreciated that the process illustrated in FIG. 6 and described here is but one option and other alternatives are possible. For example, rather than creating and maintaining the profile using the mobile device 650, a user could create and maintain the profile using a conventional general purpose computer, perhaps connecting to the profile server 660 over a conventional network, such as an intranet or the Internet.

Moreover, in certain embodiments the profile server 660 could be included as a portion of the mobile device 650 itself rather than on a separate system. In such an alternative, as will be described more fully later, the mobile device 650 could serve its profile data directly in conjunction with making calls to other receiving devices. Such an alternative embodiment would therefore, of course, obviate any operations illustrated in FIG. 6 that relate to maintaining the profile data in a separate location or uploading the profile data to the separate location.

Figure 7:
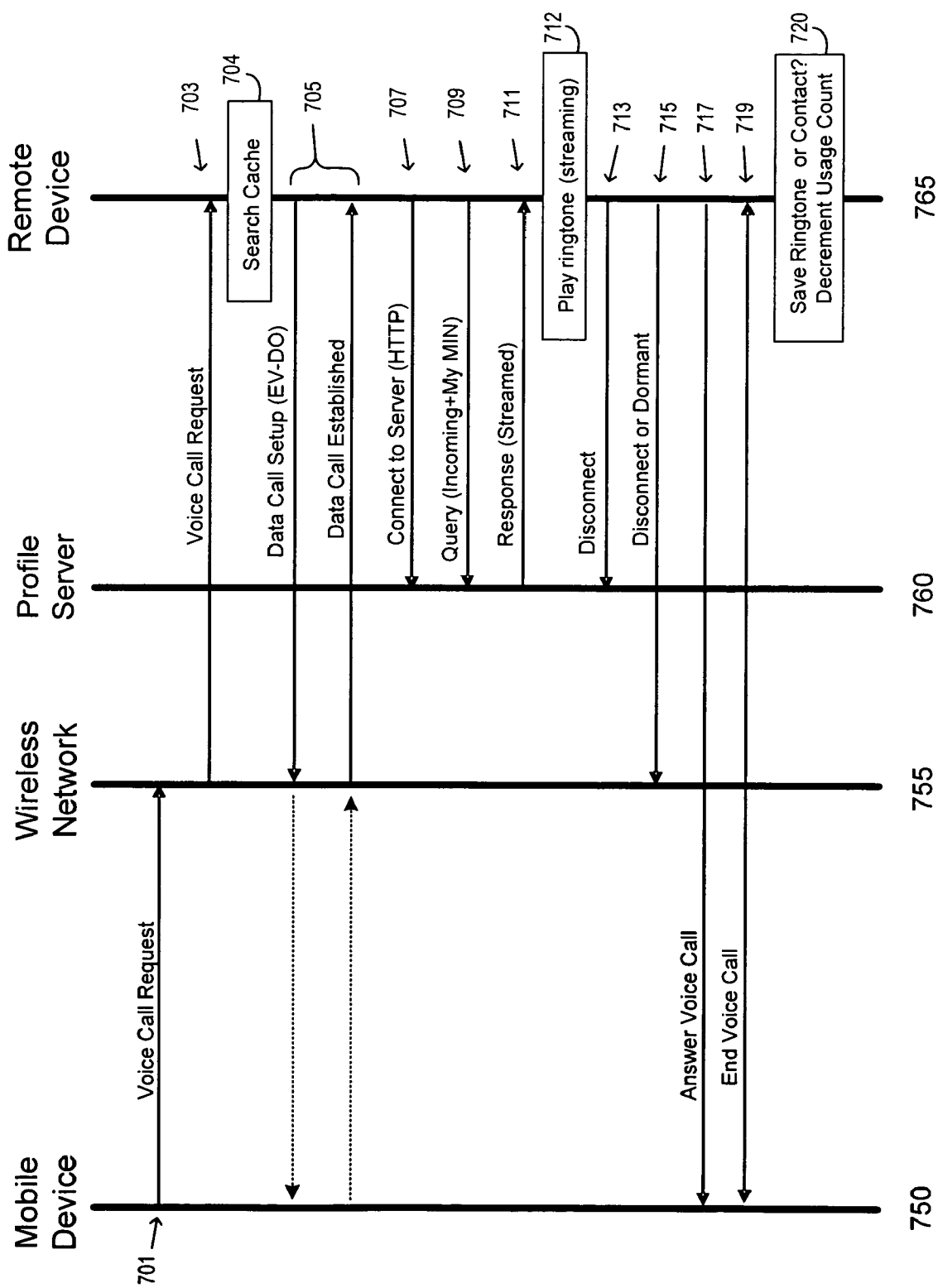
FIG. 7 is an operational flow diagram illustrating in slightly greater detail a process for announcing an incoming call with a particular call announcement as requested by the originating device.

FIG. 7 is a process diagram generally illustrating a sequence of operations performed by certain elements of a system to retrieve a remote profile in response to an incoming call. The particular elements involved in the process include a mobile device 750, a wireless network 755, a profile server 760, and a receiving device 765. Each of these four elements may be similar in configuration and functionality to their counterparts described at length above. The process begins at step 701.

At step 701, a voice call request is issued from the mobile device 750 to the wireless network 755. The voice call request includes information that identifies the mobile device 750, such as the ESN and MIN of the mobile device 750. In addition, the request includes the called number, meaning the phone number (or perhaps MIN) of the receiving device 765.

At step 703, the wireless network 755 notifies the receiving device 765 of the incoming call request. The wireless network 755 passes the voice call request to the receiving device 765 based on the called number provided by the mobile device 750. The voice call request passed to the receiving device 765 may include identifying information, such as caller ID information or similar, that identifies the mobile device 750. In certain enhancements, the notification transmitted at this step could include the signature of the profile that may have been created as described above.

At step 704, the remote device 765 could search its local data storage for information, such as an appropriate ringtone or contact information, to display in connection with the incoming call. For example, the remote device 765 may already have a particular announcement stored for use in connection with incoming calls from the mobile device 750. If not, or if the remote device 765 is configured to check each time an incoming call arrives, then the process continues. In the case where a signature of the profile has been received, the remote device 765 could determine, in addition to whether the profile is local, whether the local profile is the most current.

At step 705, a data call is initiated and established between the remote device 765 and the wireless network 755. In one particular embodiment, the data call may be established using an EV-DO technology that supports simultaneous voice calls and data calls. In an alternative where the profile server 760 is embedded within the mobile device 750, then the data call could effectively be established between the remote device 765 and the originating mobile device 750. This alternative could include establishing a second data call (not shown) between the wireless network 755 and the originating mobile device 750. It will be appreciated that the remaining steps described below have equal applicability even if the profile server 760 is included in, or collocated with, the mobile device 750. In still another alternative, the data call could be established between the remote device 765 and the originating mobile device 750 at an arbitrary or predetermined time that is not associated with an incoming voice call, such as periodically to update locally-stored contact information.

At step 707, the receiving device 765 connects to the profile server 760 over the data call just established. The connection could use a hypertext transfer mechanism in combination with a packet-based protocol, such as HTTP over a TCP/IP connection, or any other transport protocol.

At step 709, the receiving device 765 issues a query to the profile server 760 for the profile data. The receiving device 765 may identify the profile of interest using the incoming phone number of the mobile device 750, or the like. In one enhancement, the query could include information to make the data transfer more efficient. For example, if one version of the profile data already exists at the receiving device 750, it could possibly transmit the signature (e.g., a hash) of the local version of the profile data with the query. In this way, the profile server 760 could use the signature to determine if any changes have been made to the profile data at the profile server 760 since the last time the receiving device 765 retrieved it.

At step 711, the profile server 760 responds to the receiving device 765 by returning the profile data. In one example, if the profile data includes a call announcement like a ringtone, the profile server 760 could immediately begin streaming the call announcement to the remote device 765. Alternatively, if the profile data includes contact information, the profile server 760 could transmit that contact information. In yet another alternative, the profile data could include an image, perhaps in multi-resolution format (e.g., JPEG2000 format). In that case, the profile server 760 could begin by transmitting the lowest resolution level of detail of the image while transmitting each subsequent level of detail up to the supportable resolution of the remote device 765. In this way, the remote device 765 could begin rendering the image sooner than if it had to wait for the entire full resolution image.

At step 712, if appropriate, the profile data is used to announce the incoming call. Using the above examples, the ringtone could be played to announce the call, the contact information could be used to identify the caller, and/or the image could be used to display a likeness of the caller (or other image).

At step 713, the receiving device 765 disconnects the data session with the profile server 760. At step 715, the receiving device 765 disconnects the data call with the wireless network 755 or the data call goes dormant.

At step 717, the receiving device 765 accepts the incoming voice call from the mobile device 750, thus enabling voice (or other, e.g. video) communication between the user of the receiving device 765 and the user of the mobile device 750. At step 719, when the conversation between the two users is concluded, the voice call between the receiving device 765 and the mobile device 750 is ended.

It should be noted that steps 713 and 715 do not necessarily need to be performed in any particular order with respect to steps 717 and 719. In other words, using certain technologies the data connection and the voice call can be maintained simultaneously. Using such a technology, it would not be necessary to terminate the data call before conducting the voice call.

At step 720, the receiving device 765 may prompt to save the profile data, such as the ringtone, contact information, or the like. In certain specific implementations, the account associated with the remote device 765 could be charged a fee for saving the profile data.

Figure 8:
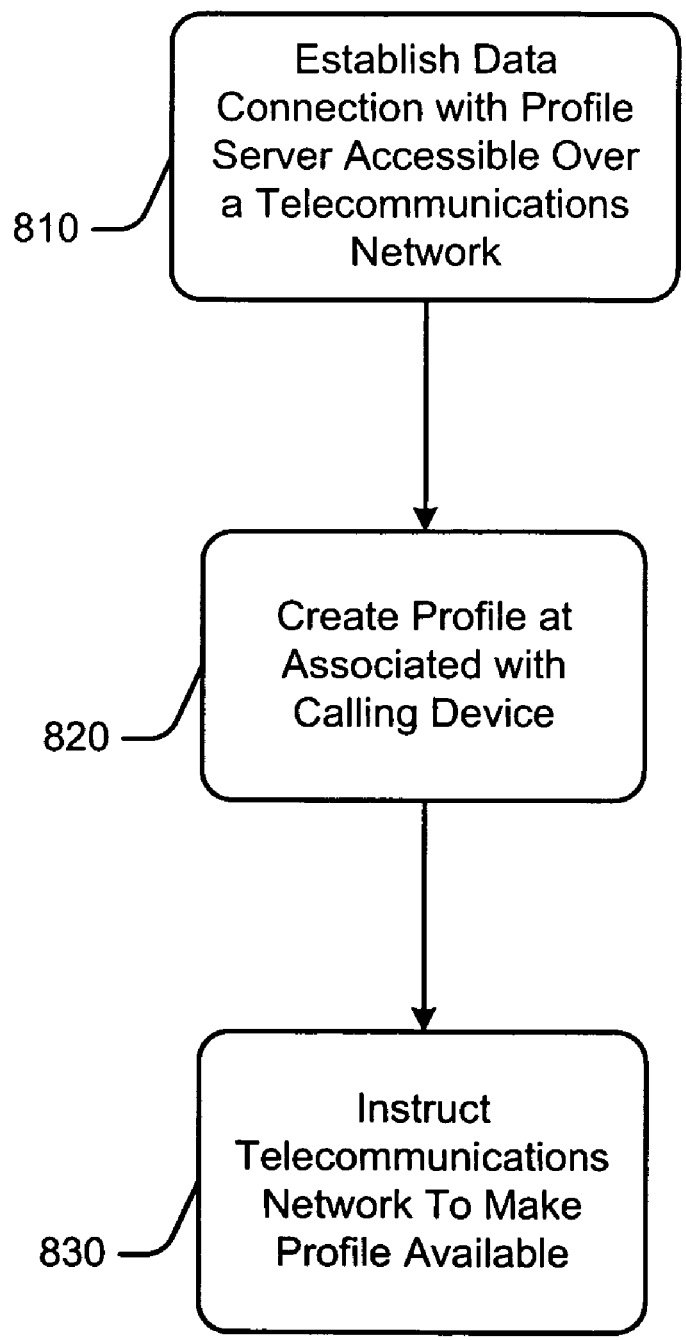
FIG. 8 is a process diagram generally illustrating steps that may be performed to create or maintain a remote profile that includes information about a calling device.

FIG. 8 is a process diagram generally illustrating steps that may be performed by a process for making profile data available to receiving devices. The process begins with a user of a communications device creating or modifying a profile intended to be shared over a telecommunications network. The process begins at step 810.

At step 810, a data connection is established with a profile server that is accessible by a remote device over a telecommunications network. The data connection may be established using a mobile device with which the profile is to be associated, or alternatively, the data connection may be established using any computing device operatively coupled to the profile server.

At step 820, the profile is created at the profile server. In this implementation, the profile is associated with a calling device and includes profile data that may describe characteristics of the calling device, particular behavioral criteria intended for a receiving device, or any other arbitrary data.

At step 830, the telecommunications network is instructed to make the profile data available to a remote device from the calling device. In one example, the profile data may be made available to the remote device in response to a call from the calling device to the remote device. In other words, a call from the calling device constitutes implicit authorization to the receiving device for access to the profile data.

Figure 9:
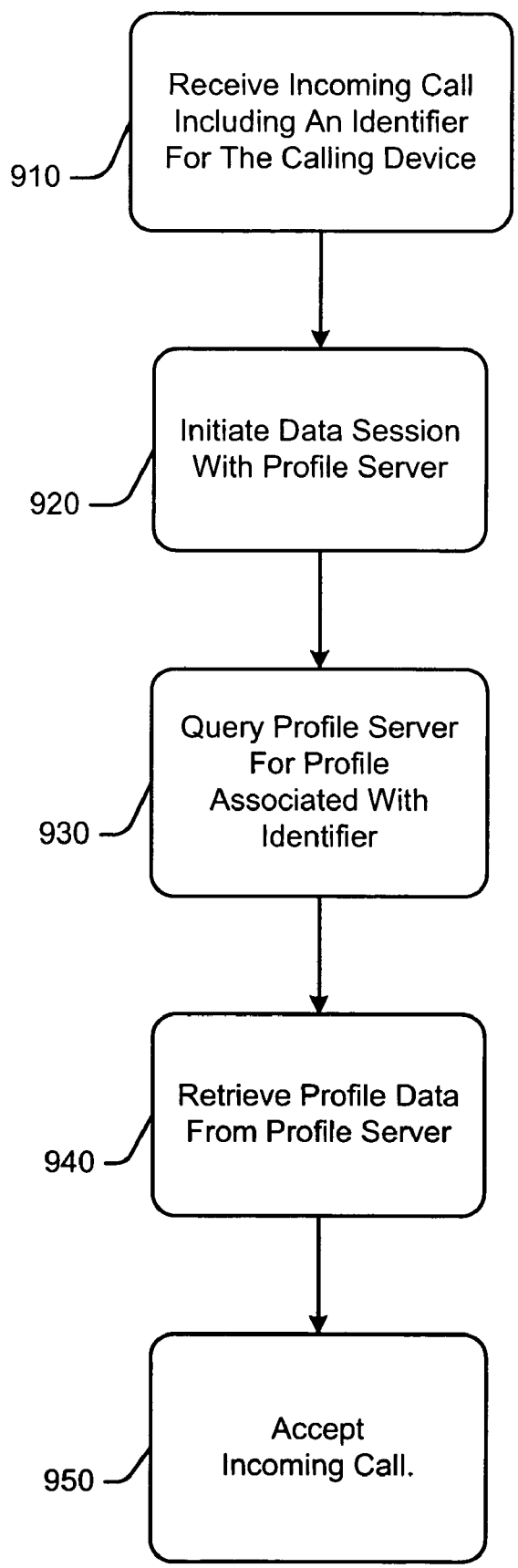
FIG. 9 is a process diagram generally illustrating steps that may be performed to retrieve remote profile data about a calling device when receiving a call from the calling device on a receiving device.

FIG. 9 is a process diagram generally illustrating steps that may be performed by a process for receiving profile data about a calling device at a receiving device. The process begins when a user of a calling device initiates a call, such as a voice call, to the receiving device. The process begins at step 910.

At step 910, call data associated with an incoming call is received at the receiving device. The call data includes an identifier for the calling device. Examples of the identifier include a phone number or MIN and ESN for the calling device.

At step 920, a data session is initiated with a profile server. The data session may be supported by a concurrent data call over the telecommunications network. In one example, an EV-DO communications technology may be used to support the data call.

At step 930, the profile server is queried for a profile associated with the calling device. The identifier for the calling device may be used to identify the profile of interest. The profile contains the profile data, which may include a call announcement, contact information, images, or the like.

At step 940, the profile data is retrieved from the profile server. In one example, the profile data may be streamed to the receiving device in a streaming audio format. In another example, the profile data may be delivered to the receiving device as textual contact information, an image or avatar, or the like.

At step 950, the profile data is used in connection with the incoming call. In one example, the profile data may be used to announce the incoming voice call, such as by playing the streaming audio file as a ringtone. In addition, the profile data may be used to update contact information for the calling device stored on the receiving device.

Figure 10:
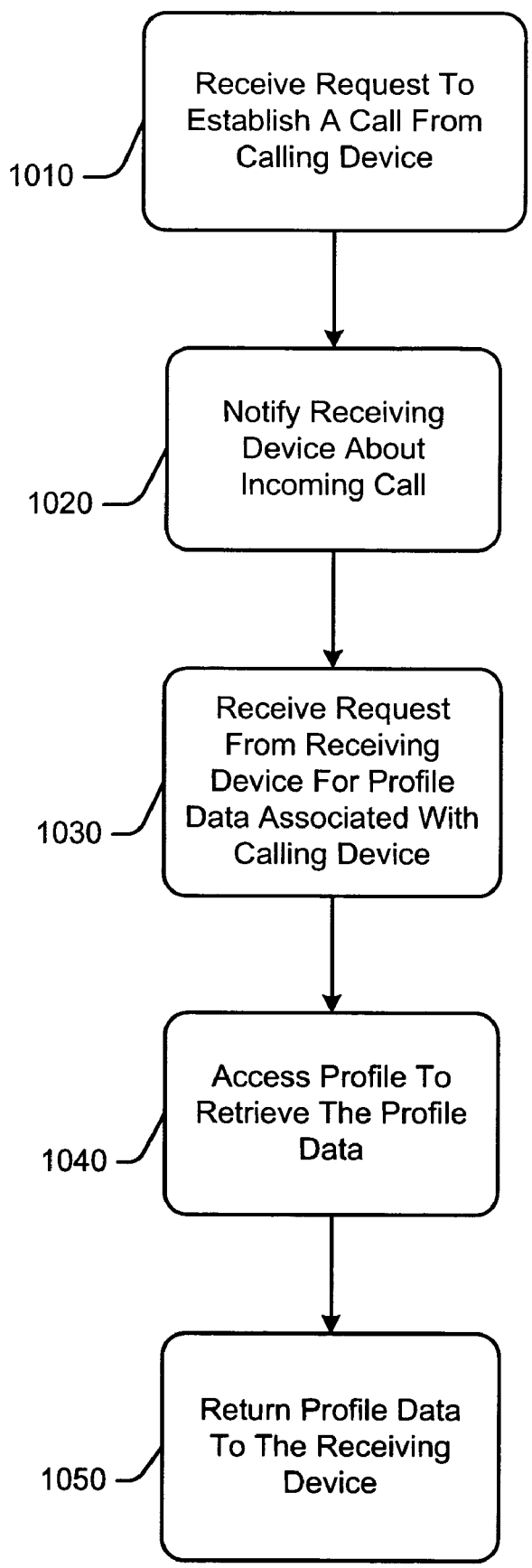
FIG. 10 is a process diagram generally illustrating steps that may be performed to facilitate the delivery of profile data to a receiving device about a calling device.

FIG. 10 is a process diagram generally illustrating steps that may be performed by a process for facilitating the delivery of profile data about a calling device to a receiving device. In one implementation, the process may be performed by components of a telecommunications network, such as a wireless network. The process begins at step 1010.

At step 1010, a request is received to establish a call from the calling device to the receiving device. The request could take the form of a conventional call request from the calling device that includes the called number, the calling number (e.g., the MIN for the calling device), and an ESN for the calling device.

At step 1020, the receiving device is notified of the call. In one example, the telecommunications network initiates the setup of the voice call with the receiving device. The notification includes an identifier for the calling device (e.g., the MIN/ESN pair for the calling device).

At step 1030, a request is received from the receiving device for profile data associated with the calling device. The request may be transmitted over a concurrent data call with the telecommunications network, and may include the identifier.

At step 1040, a profile corresponding to the identifier is accessed to retrieve the profile data. The profile may be stored on a profile server that is in operative communication with the telecommunications network, perhaps over a wide area network.

At step 1050, the profile data is returned to the receiving device, where it may be used in any appropriate manner such as to announce the incoming call or to update contact information on the receiving device for the calling device.

While the present invention has been described with reference to particular embodiments and implementations, it should be understood that these are illustrative only, and that the scope of the invention is not limited to these embodiments. Many variations, modifications, additions and improvements to the embodiments described above are possible. These variations, modifications, additions and improvements fall within the scope of the invention as detailed within the following claims.

We claim:

1. A method for making profile data available to called subscriber devices, comprising:
   establishing a data connection with a profile server, the profile server being accessible by a called subscriber device over a telecommunications network;
   creating a profile at the profile server, the profile including profile data, the profile being associated with a calling device; and
   authorizing the telecommunications network to make the profile data available to the called subscriber device responsive to a query for the profile data at the profile server from the called subscriber device.

2. The method recited in claim 1, wherein the data connection is established over a wireless network.

3. The method recited in claim 1, wherein the data connection is established over a wired network.

4. The method recited in claim 1, wherein the profile server resides in either the calling device or the called subscriber device.

5. The method recited in claim 1, wherein the data connection is established over a wide area network.

6. The method recited in claim 1, wherein the profile data is made available to the called subscriber device in response to a call to the called subscriber device from the calling device.

7. The method recited in claim 1, wherein the profile data is made available to the called subscriber device independent of a voice communication from the calling device to the called subscriber device.

8. The method recited in claim 1, wherein the telecommunications network comprises a wireless communications network.

9. The method recited in claim 1, wherein the profile data includes information intended to be shared over the telecommunications network.

10. The method recited in claim 9, wherein the information comprises at least one of a call announcement, contact information, images, and a message.

11. A method for receiving profile data about a calling device at a called subscriber device, comprising:
    receiving call data associated with an incoming call, the call data including an identifier for the calling device;
    initiating a data session between the called subscriber device and a profile server;
    querying, from the called subscriber device, the profile server for a profile associated with the calling device using the identifier, the profile containing the profile data;
    retrieving the profile data from the profile server; and
    using the profile data in connection with the incoming call.

12. The method recited in claim 11, wherein the steps of initiating the data session, querying the profile server, and retrieving the profile data are executed by a component of a telecommunications network.

13. The method recited in claim 12, wherein the component comprises the called subscriber device.

14. The method recited in claim 11, wherein the identifier comprises a selected one or more of a phone number, a mobile identification number, an electronic serial number, and/or a mobile equipment identification number.

15. The method recited in claim 11, wherein the profile data includes at least one of a call announcement, contact information, images, and a message.

16. The method recited in claim 15, wherein the call announcement comprises an audio file, and wherein retrieving the profile data comprises receiving the audio file as streaming data.

17. The method recited in claim 11, wherein using the profile data comprises receiving streaming audio data and announcing the incoming call using the streaming audio data.

18. The method recited in claim 11, further comprising, prompting to save the profile data on the called subscriber device.

19. The method recited in claim 18, wherein prompting to save the profile data occurs upon completion of the incoming call.

20. The method recited in claim 11, wherein using the profile data comprises updating contact information about the calling device at the called subscriber device.

21. A method for facilitating the delivery of profile data about a calling device to a called subscriber device, comprising:
    receiving a request to establish a call from the calling device to the called subscriber device;
    notifying the called subscriber device about the call, the notification including an identifier for the calling device;
    receiving a request from the called subscriber device for profile data associated with the calling device based on the identifier;
    accessing a profile corresponding to the identifier to retrieve the profile data; and
    returning the profile data to the called subscriber device.

22. The method recited in claim 21, wherein the identifier comprises a selected one or more of a phone number, a mobile identification number, an electronic serial number, and/or a mobile equipment identification number.

23. The method recited in claim 21, wherein the profile data includes at least one of a call announcement, contact information, images, and a message.

24. The method recited in claim 23, wherein the call announcement comprises an audio file, and wherein returning the profile data comprises streaming the audio file to the called subscriber device.

25. The method recited in claim 21, wherein accessing the profile comprises establishing a connection to a profile server and querying the profile server for the profile data.

26. The method recited in claim 21, wherein returning the profile data comprises transmitting contact information about the calling device to the called subscriber device.

27. The method recited in claim 21, wherein returning the profile data comprises transmitting a message to the called subscriber device.

28. The method recited in claim 21, wherein returning the profile data comprises transmitting an image to the called subscriber device.

29. The method recited in claim 21, further comprising determining that the called subscriber device is authorized to retrieve the profile data based on subscription information.

30. The method recited in claim 21, wherein the profile data includes a call announcement specifically associated with the called subscriber device.

31. The method recited in claim 30, wherein the profile further comprises another call announcement associated with another called subscriber device.

32. The method recited in claim 21, wherein the request from the called subscriber device is received over a concurrent data call.

33. A called subscriber device configured to communicate with a calling device comprising:
 a communications module for communicating with a wireless network;
 a storage medium for storing profile data;
 a processor for executing computer code; and
 a memory readable by the processor and including executable instructions configured to cause the processor to:
  receive call data associated with an incoming call, the call data including an identifier for the calling device;
  initiate a data session between the called subscriber device and a profile server over the wireless network;
  query, from the called subscriber device, the profile server for a profile associated with the calling device using the identifier, the profile containing the profile data;
  retrieve the profile data from the profile server using the data session; and
  use the profile data in connection with the incoming call.

34. The device recited in claim 33, wherein the identifier comprises a selected one or more of a phone number, a mobile identification number, an electronic serial number, and/or a mobile equipment identification number.

35. The device recited in claim 33, wherein the profile data includes at least one of a call announcement, contact information, images, and a message.

36. The device recited in claim 35, wherein the call announcement comprises an audio file, and wherein the profile data is retrieved as streaming audio data.

37. The device recited in claim 33, wherein the profile data is used to announce the incoming call.

38. The device recited in claim 33, wherein the profile data is used to update locally stored contact information for the calling device.

39. A system for facilitating the delivery of profile data to a called subscriber device, the system comprising:
 a server including a communications module for communicating with a calling device and the called subscriber device;
 a storage medium for storing a profile including profile data;
 a processor for executing computer code; and
 a memory containing computer-executable instructions which, when executed by the processor, are operative to:
  receive a request to establish a call from the calling device to the called subscriber device;
  notify the called subscriber device about the call, the notification including an identifier for the calling device;
  receive a request from the called subscriber device for profile data associated with the calling device based on the identifier;
  access a profile corresponding to the identifier to retrieve the profile data; and
  return the profile data to the called subscriber device.

40. A device for announcing an incoming call on a called subscriber device, comprising:
 means for receiving call data associated with an incoming call;
 means for analyzing the call data to determine whether a particular call announcement has been requested;
 means for determining if the requested call announcement resides locally on the called subscriber device if the particular call announcement has been requested; and
 means for announcing the call using the requested call announcement if the requested call announcement does reside locally.

41. A system for facilitating the delivery of profile data about a calling device to a called subscriber device, comprising:
 means for receiving a request to establish a call from the calling device to the called subscriber device;
 means for notifying the called subscriber device about the call, the notification including an identifier for the calling device;
 means for receiving a request from the called subscriber device for profile data associated with the calling device based on the identifier;
 means for accessing a profile corresponding to the identifier to retrieve the profile data; and
 means for returning the profile data to the called subscriber device.

42. A computer-readable storage medium encoded with computer-executable instructions for receiving profile data about a calling device at a called subscriber device, the instructions comprising:
 receiving call data associated with an incoming call, the call data including an identifier for the calling device;
 initiating a data session between the called subscriber device and a profile server;
 querying, from the called subscriber device, the profile server for a profile associated with the calling device using the identifier, the profile containing the profile data;
 retrieving the profile data from the profile server; and
 using the profile data in connection with the incoming call.

43. A computer-readable storage medium encoded with computer-executable instructions for facilitating the delivery of profile data about a calling device to a called subscriber device, the instructions comprising:
 receiving a request to establish a call from the calling device to the called subscriber device;
 notifying the called subscriber device about the call, the notification including an identifier for the calling device;
 receiving a request from the called subscriber device for profile data associated with the calling device based on the identifier;
 accessing a profile corresponding to the identifier to retrieve the profile data; and
 returning the profile data to the receiving device.

44. The method of claim 11, wherein the querying is performed before the called subscriber device accepts and/or answers the incoming call.

* * * * *

UNITED STATES PATENT AND TRADEMARK OFFICE
CERTIFICATE OF CORRECTION

| | | |
|---|---|---|
| PATENT NO. | : 7,940,908 B2 | Page 1 of 1 |
| APPLICATION NO. | : 11/361406 | |
| DATED | : May 10, 2011 | |
| INVENTOR(S) | : Sprigg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1388 days.

Signed and Sealed this
Eleventh Day of October, 2011

David J. Kappos
*Director of the United States Patent and Trademark Office*